United States Patent
Prochnow

(10) Patent No.: US 12,494,033 B2
(45) Date of Patent: Dec. 9, 2025

(54) SYSTEMS AND METHODS FOR ANALYZING CLUSTERS OF TYPE CURVE REGIONS AS A FUNCTION OF POSITION IN A SUBSURFACE VOLUME OF INTEREST

(71) Applicant: CHEVRON U.S.A. INC., San Ramon, CA (US)

(72) Inventor: Shane J. Prochnow, Fredericksburg, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 166 days.

(21) Appl. No.: 18/096,986

(22) Filed: Jan. 13, 2023

(65) Prior Publication Data

US 2023/0230338 A1 Jul. 20, 2023

Related U.S. Application Data

(60) Provisional application No. 63/299,598, filed on Jan. 14, 2022.

(51) Int. Cl.
*G06V 10/25* (2022.01)
*G01V 1/00* (2006.01)
(Continued)

(52) U.S. Cl.
CPC .............. *G06V 10/25* (2022.01); *G01V 1/003* (2013.01); *G06T 15/08* (2013.01); *G06V 10/431* (2022.01); *G06V 10/763* (2022.01)

(58) Field of Classification Search
CPC .... G06V 10/25; G06V 10/431; G06V 10/763; G01V 1/003; G06T 15/08
See application file for complete search history.

(56) References Cited

U.S. PATENT DOCUMENTS

| | | |
|---|---|---|
| 6,574,565 B1 | 6/2003 | Bush |
| 10,260,319 B2 | 4/2019 | Sarduy et al. |

(Continued)

FOREIGN PATENT DOCUMENTS

WO  WO 2021/055287 A1  3/2021

OTHER PUBLICATIONS

Wachtmeister, H., Lund, L., Aleklett, K. et al. Production Decline Curves of Tight Oil Wells in Eagle Ford Shale. Nat Resour Res 26, 365-377 (2017). https://doi.org/10.1007/s11053-016-9323-2 (Year: 2017).*

(Continued)

*Primary Examiner* — Ming Y Hon
*Assistant Examiner* — Amanda H Pearson
(74) *Attorney, Agent, or Firm* — Sheppard, Mullin, Richter & Hampton LLP

(57) ABSTRACT

Methods, systems, and non-transitory computer readable media for analyzing type curve regions in a subsurface volume of interest are disclosed. Exemplary implementations may include: obtaining initial clusters of type curve regions in the subsurface volume of interest; obtaining production values as a function of position; generating an autocorrelation correction factor; attributing the autocorrelation correction factor to the production values as a function of position; generating type curve mean values; generating range distribution values; generating a type curve cluster probability value for each of the type curve regions; generating a first representation of the type curve regions as a function of position; clustering the type curve regions in updated clusters; generating a second representation of the type curve regions as a function of position; and displaying one or more of the first representation and the second representation.

20 Claims, 6 Drawing Sheets

(51) Int. Cl.
*G06T 15/08* (2011.01)
*G06V 10/42* (2022.01)
*G06V 10/762* (2022.01)

(56) References Cited

U.S. PATENT DOCUMENTS

| | | |
|---|---|---|
| 12,007,518 B2 | 6/2024 | Prochnow et al. |
| 2019/0120998 A1* | 4/2019 | Prochnow ............... G01V 20/00 |
| 2019/0179046 A1 | 6/2019 | Thorne et al. |
| 2020/0278467 A1* | 9/2020 | Jain ........................ G06N 20/00 |
| 2021/0277769 A1* | 9/2021 | Shetty ..................... E21B 47/06 |

OTHER PUBLICATIONS

Extended European Search Report dated Jun. 12, 2023 for European Application No. 23151636.0.
Cmkovic-Friis et al., "SPE-174799-MS: Geology Driven EUR Prediction Using Deep Learning," Society of Petroleum Engineers (2015), 10 pages. Retrieved from the Internet: https://www.researchgate.net/publication/301405979_Geology_Driven_EUR_Predication_Using_Deep_Learning.
Kocoglu et al., "Machine Learning Based Decline Curve—Spatial Method to Estimate Production Potential of Proposed Wells in Unconventional Shale Gas Reservoirs," Unconventional Resources Technology Conference, Austin, Texas (Jul. 20-22, 2020), URTeC 3108, DOI 10.15530/urtec-2020-3108, 19 pages.

* cited by examiner

SYSTEMS AND METHODS FOR ANALYZING CLUSTERS OF TYPE CURVE REGIONS AS A FUNCTION OF POSITION IN A SUBSURFACE VOLUME OF INTEREST

CROSS-REFERENCE TO RELATED APPLICATION

The present application claims priority to U.S. Patent Application No. 63/299,598, filed Jan. 14, 2022 and titled "TYPE CURVE VALIDATION," which is incorporated herein by reference in its entirety.

FIELD OF THE DISCLOSURE

The present disclosure relates to systems and methods for analyzing clusters of type curve regions as a function of position in a subsurface volume of interest.

SUMMARY

Implementations of the disclosure are directed to systems and methods for analyzing clusters of type curve regions as a function of position in a subsurface volume of interest.

An aspect of the present disclosure relates to a computer-implemented method for analyzing type curve regions in a subsurface volume of interest. The method may be implemented in a computer system that includes a physical computer processor and non-transitory storage medium. The method may include a number of steps. One step may include obtaining initial clusters of type curve regions in the subsurface volume of interest. The initial clusters may be geographically adjacent regions in the subsurface volume of interest. Another step may include obtaining production values as a function of position corresponding to the type curve regions corresponding to the initial clusters. Yet another step may include generating an autocorrelation correction factor by at least comparing changes between individual ones of the production values that are geographically adjacent to other ones of the production values as a function of position. Another step may include attributing the autocorrelation correction factor to the production values as a function of position to generate autocorrelated production values. Yet another step may include generating type curve mean values by at least comparing mean values of the autocorrelated production values of geographically adjacent type curve regions. Another step may include generating range distribution values by at least comparing a first autocorrelated production value with a second autocorrelated production value. Yet another step may include generating a type curve cluster probability value for each of the type curve regions based on at least the type curve mean values and the range distribution values.

In implementations, the computer system may further include a display. One of the steps of the method may include generating a first representation of the type curve regions as a function of position in the subsurface volume of interest using visual effects to depict type curve cluster probability values corresponding to the type curve regions. Another step may include displaying the representation.

In implementations, one step of the method may include clustering the type curve regions in updated clusters to reflect the type curve cluster probability value for each of the type curve regions. The updated clusters may be clustered together in a given updated cluster based on type curve cluster probability values of geographically adjacent type curve regions exceeding a threshold value.

In implementations, the threshold value may be between 50% and 99.9%.

In implementations, the updated clusters may be used to inform a fracture operation, a drilling operation, or a combination thereof in the given updated cluster.

In implementations, the computer system may further include a display. One of the steps of the method may include generating a second representation of the type curve regions as a function of position in the subsurface volume of interest using visual effects to depict geographic boundaries outlining at least some of the updated clusters of the type curve regions. Another step may include displaying the representation.

In implementations, the autocorrelation correction factor may be generated by determining the mean and variance of the production values, generating a deviation from the mean for every production value, multiplying and adding the deviations from the mean to generate summed cross products, and normalizing the summed cross products by variance.

In implementations, the type curve cluster probability value for each of the type curve regions may be generated by a number of steps. One step may include analyzing a variance on one or more of the production values in the subsurface volume of interest. Another step may include comparing a cluster with other clusters in the initial clusters with respect to means, means square within, number of samples within a given cluster, and degrees of freedom within the given cluster. Yet another step may include generating a first type curve similarity value based on a pooled sample variance, a sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and a mean squared error. Yet another step may include comparing the first type curve similarity value with the second type curve similarity value.

An aspect of the present disclosure relates to a system for analyzing type curve regions in a subsurface volume of interest. The system may include non-transitory storage medium. The system may also include a physical computer processor configured by machine readable instructions to perform a number of steps. One step may include obtaining initial clusters of type curve regions in the subsurface volume of interest. The initial clusters may be geographically adjacent regions in the subsurface volume of interest. Another step may include obtaining production values as a function of position corresponding to the type curve regions corresponding to the initial clusters. Yet another step may include generating an autocorrelation correction factor by at least comparing changes between individual ones of the production values that are geographically adjacent to other ones of the production values as a function of position. Another step may include attributing the autocorrelation correction factor to the production values as a function of position to generate autocorrelated production values. Yet another step may include generating type curve mean values by at least comparing mean values of the autocorrelated production values of geographically adjacent type curve regions. Another step may include generating range distribution values by at least comparing a first autocorrelated production value with a second autocorrelated production value. Yet another step may include generating a type curve cluster probability value for each of the type curve regions based on at least the type curve mean values and the range distribution values.

In implementations, the system may further include a display. One of the steps of may include generating a first representation of the type curve regions as a function of position in the subsurface volume of interest using visual effects to depict type curve cluster probability values corresponding to the type curve regions. Another step may include displaying the representation.

In implementations, one step may include clustering the type curve regions in updated clusters to reflect the type curve cluster probability value for each of the type curve regions. The updated clusters may be clustered together in a given updated cluster based on type curve cluster probability values of geographically adjacent type curve regions exceeding a threshold value.

In implementations, the threshold value may be between 50% and 99.9%.

In implementations, the updated clusters may be used to inform a fracture operation, a drilling operation, or a combination thereof in the given updated cluster.

In implementations, the system may further include a display. One of the steps of the method may include generating a second representation of the type curve regions as a function of position in the subsurface volume of interest using visual effects to depict geographic boundaries outlining at least some of the updated clusters of the type curve regions. Another step may include displaying the representation.

In implementations, the autocorrelation correction factor may be generated by performing a number of steps. One step may include determining the mean and variance of the production values. Another step may include generating a deviation from the mean for every production value. Yet another step may include multiplying and adding the deviations from the mean to generate summed cross products. Another step may include normalizing the summed cross products by variance.

In implementations, the type curve cluster probability value for each of the type curve regions may be generated by a number of steps. One step may include analyzing a variance on one or more of the production values in the subsurface volume of interest. Another step may include comparing a cluster with other clusters in the initial clusters with respect to means, means square within, number of samples within a given cluster, and degrees of freedom within the given cluster. Yet another step may include generating a first type curve similarity value based on a pooled sample variance, a sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and a mean squared error. Yet another step may include comparing the first type curve similarity value with the second type curve similarity value.

An aspect of the present disclosure relates to a non-transitory computer-readable storage medium storing instruction for analyzing type curve regions in a subsurface volume of interest. The instructions may be configured to, when executed, perform a number of steps. One step may include obtaining initial clusters of type curve regions in the subsurface volume of interest. The initial clusters may be geographically adjacent regions in the subsurface volume of interest. Another step may include obtaining production values as a function of position corresponding to the type curve regions corresponding to the initial clusters. Yet another step may include generating an autocorrelation correction factor by at least comparing changes between individual ones of the production values that are geographically adjacent to other ones of the production values as a function of position. Another step may include attributing the autocorrelation correction factor to the production values as a function of position to generate autocorrelated production values. Yet another step may include generating type curve mean values by at least comparing mean values of the autocorrelated production values of geographically adjacent type curve regions. Another step may include generating range distribution values by at least comparing a first autocorrelated production value with a second autocorrelated production value. Yet another step may include generating a type curve cluster probability value for each of the type curve regions based on at least the type curve mean values and the range distribution values.

In implementations, one of the steps of may include generating a first representation of the type curve regions as a function of position in the subsurface volume of interest using visual effects to depict type curve cluster probability values corresponding to the type curve regions. Another step may include displaying the representation.

In implementations, one step may include clustering the type curve regions in updated clusters to reflect the type curve cluster probability value for each of the type curve regions. The updated clusters may be clustered together in a given updated cluster based on type curve cluster probability values of geographically adjacent type curve regions exceeding a threshold value.

In implementations, the threshold value may be between 50% and 99.9%.

In implementations, the updated clusters may be used to inform a fracture operation, a drilling operation, or a combination thereof in the given updated cluster.

In implementations, one of the steps of the method may include generating a second representation of the type curve regions as a function of position in the subsurface volume of interest using visual effects to depict geographic boundaries outlining at least some of the updated clusters of the type curve regions. Another step may include displaying the representation.

In implementations, the autocorrelation correction factor may be generated by performing a number of steps. One step may include determining the mean and variance of the production values. Another step may include generating a deviation from the mean for every production value. Yet another step may include multiplying and adding the deviations from the mean to generate summed cross products. Another step may include normalizing the summed cross products by variance.

In implementations, the type curve cluster probability value for each of the type curve regions may be generated by a number of steps. One step may include analyzing a variance on one or more of the production values in the subsurface volume of interest. Another step may include comparing a cluster with other clusters in the initial clusters with respect to means, means square within, number of samples within a given cluster, and degrees of freedom within the given cluster. Yet another step may include generating a first type curve similarity value based on a pooled sample variance, a sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and a mean squared error. Yet another step may include comparing the first type curve similarity value with the second type curve similarity value.

These and other features, and characteristics of the present technology, as well as the methods of operation and functions of the related elements of structure and the combination of parts and economies of manufacture, will become more apparent upon consideration of the following description and the appended Claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the Claims, the singular form of "a", "an", and "the" include plural referents unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

DETAILED DESCRIPTION

Figure 1:
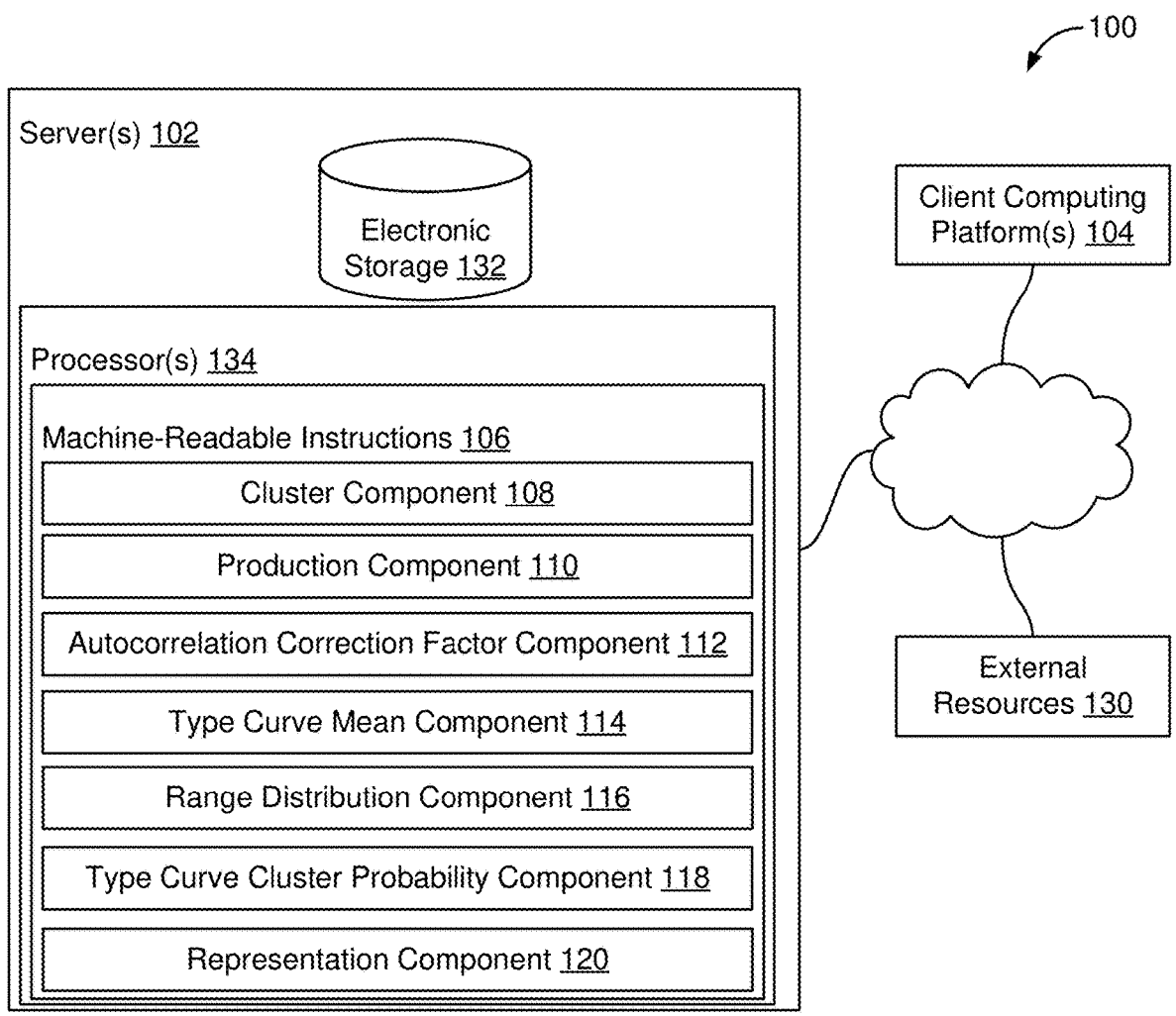
FIG. 1 shows a system configured for analyzing clusters of type curve regions as a function of position in a subsurface volume of interest, in accordance with one or more implementations.

Existing approaches for type curve analysis of tight rock asset classes are labor-intensive processes that require incredibly complex updates that are difficult to track. Moreover, existing approaches often rely on analog wells to representatively characterize a greater geographic region of the subsurface volume than is appropriate. These geographic regions, or clusters of type curve regions, are generally constructed quasi-subjectively while a subsurface volume matures. These existing approaches often fail to account for natural clustering of relative well performance in geographic space due to the changing impact of reservoir and production parameters. In addition, these subjective methods used often fail to account for reservoir properties for production or continuous reservoir changes. The existing approaches also do not account for statistical significance of nearby regions against each other or fully appreciate combining type curve regions. Accordingly, there exists a need for improved analysis of objective identification of type curve regions characterization.

The presently disclosed technology removes subjectivity from traditional type curve analysis by utilizing spatial autocorrelation and production data to generate probability values for each of the type curve regions in the subsurface volume of interest and clustering the type curve regions accordingly. Type curve regions may represent well production populations characterized by different mean production values and percentile description of the likely range of production outcomes within that region.

Disclosed below are methods, systems, and computer readable storage media that may provide analysis of clusters of type curve regions as a function of position in a subsurface volume of interest.

Reference will now be made in detail to various implementations, examples of which are illustrated in the accompanying drawings. In the following detailed description, numerous details may be set forth in order to provide a thorough understanding of the present disclosure and the implementations described herein. However, implementations described herein may be practiced without such details. In other instances, some methods, procedures, components, and mechanical apparatuses may not be described in detail, so as not to unnecessarily obscure aspects of the implementations.

The presently disclosed technology includes implementations of a method, system, and non-transitory computer-readable medium for analyzing clusters of type curve regions as a function of position in a subsurface volume of interest. The subsurface volume of interest may include, or be bounded by, one or more of a water surface, a ground surface, and/or other surfaces. The presently disclosed technology may be able to reduce the time to identify clusters of type curve regions and improve forecasting, including in one of tight reservoirs and shale unconventional subsurface volumes. For example, in a given application, a tight reservoir may be a reservoir that has a permeability of less than 0.1 millidarcy. The presently disclosed technology may also reduce the number of type curve regions to be tracked. In addition, the presently disclosed technology can be used to enhance forecasting the productivity of the subsurface volume of interest. For example, the presently disclosed technology can modify how the subsurface volume of interest is operated on, whether to have ten horizontal wells in a type curve region, four horizontal wells in the same type curve region, or no horizontal wells in the same type curve region. By clarifying how the type curve regions should be clustered using the presently disclosed technology, a fracturing operation, a drilling operation, or a combination thereof may not go into effect for a given cluster, or may increase the number of operations in the given cluster. For example, understanding the similarity or dissimilarity among geographically adjacent type curve regions may impact the forecasted productivity of a given cluster, thereby impacting the decision to have an operation in the given cluster. Should a type curve region be added to an existing cluster with a given productivity may increase the total productivity with the added type curve region, making the type curve region valuable enough to perform an operation on. The presently disclosed technology may use production data and pre-clustered type curve regions to determine type curve probability values as a function of position in the subsurface volume of interest and to determine updated clusters of the type curve regions. A representation of the type curve regions as a function of position may be generated using visual effects. Type curve regions may geographically discretize continuously varying production trends that naturally occur in a hydrocarbon producing basin into a manageable system for the economic planning involved in drilling and production projects.

FIG. 1 illustrates a system 100 configured for analyzing clusters of type curve regions as a function of position in a subsurface volume of interest, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a cluster component 108, a production component 110, a autocorrelation correction factor component 112, a type curve mean component 114, a range distribution component 116, type curve cluster probability component 118, representation component 120, and/or other instruction components.

Cluster component 108 may be configured to obtain initial clusters of the type curve regions. The initial clusters may be obtained from the non-transitory storage medium and/or other sources. The initial clusters may be a group of geographically adjacent type curve regions. For example, referring to FIG. 4, subsurface volume of interest 402 may include eleven different type curve regions A-K. Type curve regions A-K may be clustered into five different initial clusters. For example, type curve regions A, B, and E may represent a first initial cluster (shaded gray in subsurface volume of interest 402), type curve regions C and D may represent a second initial cluster (with horizontal lines in subsurface volume of interest 402), type curve region F may represent a third initial cluster (with vertical lines in subsurface volume of interest 402), type curve regions G, H, and K may represent a fourth initial cluster (with horizontal and vertical lines in subsurface volume of interest 402), and type curve regions I and J may represent a fifth initial cluster (unshaded in subsurface volume of interest 402). It should be appreciated that this is an example number of clusters, and the number of clusters can be any number more than two. In this example, each of the type curve regions in a single cluster are touching another one of the type curve regions in the single cluster (e.g., type curve region G touches type curve region H, and type curve region H touches type curve region K, and these three type curve regions, G, H, and K, represent the fourth initial cluster).

In some implementations, the initial clusters may be generated using existing quasi-subjective methods as known to a person of ordinary skill in the art. In implementations, the initial clusters may be generated by a model. For example, a spatial clustering model component (not shown here) may be configured to obtain a spatial clustering model. The spatial clustering model may be obtained from the non-transitory storage medium and/or other sources. In implementations, the spatial clustering model may be based on at least a ratio between a mean productivity variation between areas in the region of interest and a productivity variation within one of the areas in the region of interest. The spatial clustering model may be able to receive as input spatially discrete or spatially continuous values that can be used to delineate the type curve regions.

In implementations, the spatial clustering model may include an unsupervised machine learning model. The unsupervised machine learning model may include adjustable hyperparameters. In some implementations, the adjustable hyperparameters may include reservoir original oil in place, porosity, geomechanics, pressure, temperature, position, and/or reservoir thickness as examples of some adjustable hyperparameters, though it should be appreciated that there are other adjustable hyperparameters. It should also be appreciated that the adjustable hyperparameters may include only reservoir original oil in place, only porosity, only geomechanics, only pressure, only temperature, only position, only reservoir thickness, or any combination of these example adjustable hyperparameters (e.g., reservoir original oil in place and porosity, porosity and geomechanics, etc.; reservoir original oil in place, porosity, and geomechanics, porosity, geomechanics, and pressure, etc.; reservoir original oil in place, porosity, geomechanics, and pressure, porosity, geomechanics, pressure, and temperature, etc.; and so on). The number of the type curve regions in the region of interest is also adjustable, and the presently disclosed technology may use statistical methods to provide guidelines as to the number of type curve regions in the region of interest.

In implementations, there may be an initial spatial clustering model. The initial spatial clustering model may be obtained from the non-transitory storage medium and/or another source. The initial spatial clustering model may be based on at least machine learning techniques to map at least one variable to at least another variable. For example, the initial spatial clustering model may receive well data, production parameter data, subsurface data, and/or other data as input and output data. The subsurface data may include geological data. Geological data may include petrophysical, core, cutting, pressure, drilling property, mudlog, seismic properties, and/or other geological data. In implementations, for unconventional reservoirs, this may include an anticipated stimulated rock volume, a natural geologic target zone, or even a gross formation interval. Geological data may be gridded. Gridding methods, such as, for example, cokriging, may provide measurable uncertainty due to interpolation in the form of standard error maps. The standard error maps may be useful for considering the inclusion of a production parameter into a parameter model (e.g., random forest algorithm), as discussed in greater detail below. The initial spatial clustering model may be "untrained" or "unconditioned," indicating it may not estimate an output based on at least the input as accurately as a "trained" or "conditioned" model.

In some implementations, an initial spatial clustering model may be trained to generate the spatial clustering model. The initial spatial clustering model may include one or more components of a gradient boost regression, a random forest, a neural network, a regression, and/or other machine learning techniques. It should be appreciated that other spatial clustering models may include, for example, convolutional neural networks, reinforcement learning, transfer learning, and/or other machine learning techniques. The initial spatial clustering model may be trained using training data. The training data may include training well data, production parameter data, subsurface data, and/or other data. The training data may be derived from seismic data, historic data, and/or other data. The seismic data may be collected from multiple seismic data sites/surveys (i.e., on a pad or regional scale) and correspond to different geophysical collection methods (i.e., 2D seismic, 3D seismic, multicomponent 3D seismic, time-lapse (4D) seismic, microseismic, VSP, and the like). In some implementations, determining productivity may be performed before spatial clustering to establish the link between production parameter data and/or other training data and well production. Once the relationship and relative impact of the training data (e.g., production parameters) is established, the data can be used to constrain the spatial delineation of resulting regions nearby or around a cluster based on the data's known and measurable impact to production.

Training the initial spatial clustering model may include applying the initial spatial clustering model to the training data to generate a first iteration of type curve regions. The initial spatial clustering model may be adjusted to more accurately estimate the type curve regions based on at least the corresponding accuracy values for the type curve regions. For example, adjustable hyperparameters may be adjusted after individual iterations of the initial spatial clustering model. This is repeated numerous times until the initial spatial clustering model is "trained," i.e., it is able to output type curve regions that are consistently within a threshold of the accuracy value. In some implementations, the threshold value may account for the speed of the spatial clustering model, resources used by the spatial clustering model, and/or other optimization metrics. This threshold may be based on at least an average of values, a minimum of values, a maximum of values, and/or other parameters. Other metrics may be applied to determine that the spatial clustering model is "conditioned" or "trained." As an example, the threshold may be with 5% of the accuracy value, though it should be appreciated that the threshold may be 10%, 15%, 25%, and so on.

In implementations, training the initial spatial clustering model may include generating synthetic seismic data, well data, and/or other data from existing assets. Training may also include deriving training data from existing assets. Training may also include validating the trained model by using testing data. The testing data may be well data, production parameter data, subsurface data, and/or other data that is not a part of the training data. Training may also include applying the spatial clustering model to the testing data to generate type curve regions. Training may also include determining accuracy values for the type curve regions.

The spatial clustering model may be able to predict type curve regions by recognizing patterns in the training data. In implementations, the various input data, including, for example, any adjustable hyperparameters, may be weighted differently. As another example, different types of well data and/or production parameter data may be weighted differently.

In some implementations, the spatial clustering model may use spatial K-means clustering, triangulation methods, and/or other models. The spatial clustering model may also use a random seed and automatically adjust the geographic extents based on at least the region of interest. The spatial clustering model may iterate to find a number of type curve regions based on at least a method of analysis of variance. For example, one method of analysis of variance may include a ratio between a mean productivity variation between areas in the region of interest and a productivity variation within one of the areas in the region of interest. Different spatial clustering models may use different criteria to determine an appropriate number of type curve regions and process by which they are delineated. The spatial clustering models all may delineate similar values based on some tolerance for variation within a nearby region.

In some implementations, the spatial clustering model may use a number of type curve regions, continuous well data, and model analysis, including, for example, f-statistics, to delineate the type curve regions.

In implementations, the type curve regions may be further refined to maximize an accuracy value. The accuracy value may be based on at least (1) a precision value, which itself quantifies a number of correct positive results made (e.g., a number of true positive predictions divided by the number of all positive predictions) and (2) a recall value, which itself quantifies a number of correct positive results made out of all positive results that could have been made (e.g., a number of true positive predictions divided by the number of all predictions that should have been identified as positive). The accuracy value may range from 0 to 1 and maximizing the accuracy value may mean adjusting variables to increase the accuracy value toward 1.

Referring back to FIG. 1, production component 110 may be configured to obtain production values as a function of position in the subsurface volume of interest. The production values may be obtained from the non-transitory storage medium and/or other sources. The production values may correspond to the type curve regions identified by the initial clusters. The production values may characterize the amount of hydrocarbons that can be extracted from a well. The production values may include one of cumulative production values, historical production values, forecasted production values, and other types of production values. The production values may include cumulative oil, gas, and/or water production at different time intervals, such as, for example, 6 months, 12 months, 18 months, or estimated ultimate recovery (EUR) and so on. Production values may include corresponding geographical coordinates, x-y coordinates, and/or other location information.

Autocorrelation correction factor component 112 may be configured to generate an autocorrelation correction factor. This may be accomplished by the physical computer processor. The autocorrelation correction factor may be generated by comparing changes between individual ones of the production values that are geographically adjacent to other ones of the production values as a function of position. In implementations, the production values over the entire subsurface volume of interest may be used to generate an autocorrelation correction factor for the subsurface volume of interest. In some implementations, the production values for each type curve region may be used to generate an autocorrelation correction factor corresponding to the type curve region, allowing for finer degrees of analysis by generating autocorrelation correction factors for each type curve region. In implementations, the sample size of production values may be the limiting factor. The sample size may be insufficient for a single type curve region and will force generalization on a greater geographic extent to gain sufficient sample numbers. In some implementations, the autocorrelation correction factor may be generated for a smaller geographical region than the type curve region corresponding to the production values used to generate the autocorrelation correction factor if samples are available in sufficient density. In implementations, the autocorrelation correction factor may be generated by determining the mean and variance of the production values. A deviation from the mean may be generated for every production value. The deviations from the mean may be multiplied and added to form summed cross products. The summed cross products may be normalized by the variance. The normalized values that are positive values near one may indicate spatial correlation of the production values, values near zero may indicate random spatial correlation, and negative values near one may indicate perfectly dispersed spatial correlation.

In implementations, autocorrelation correction factor component 112 may be configured to attribute the autocorrelation correction factor to the production values as a function of position to generate autocorrelated production values. This may be accomplished by the physical computer processor. In implementations, the autocorrelation correction factor may be part of the metadata for the production values. In some implementations, the autocorrelation correction factor may weight the number of samples of production values as a function of position. In implementations, the autocorrelation correction factor may be used in generating a more accurate type curve cluster probability, as will be described herein.

Type curve mean component 114 may be configured to generate type curve mean values by comparing mean values of the autocorrelated production values of geographically adjacent type curve regions. This may be accomplished by the physical computer processor. For example, referring to FIG. 3, the mean values of the autocorrelation production values for type curve region A may be compared to the mean values of the autocorrelation production values for type curve regions, B, C, D, and E. The mean values of the autocorrelation production values for type curve region B may be compared to the mean values of the autocorrelation production values for type curve regions, A (assuming this is not already calculated), E, and J, and so on until all of the mean values of the autocorrelation production values are compared in each of the type curve regions of the subsurface volume of interest. In some implementations, comparing the two mean values may be the difference between the two values.

Referring back to FIG. 1, range distribution component 116 may be configured to generate range distribution values by at least comparing a first autocorrelated production value with a second autocorrelated production value. This may be accomplished by the physical computer processor. In implementations, the first autocorrelated production value may be the largest mean value in the subsurface volume of interest. In some implementations, the first autocorrelated production value may be the largest mean value in a given type curve region. In implementations, the second autocorrelated production value may be the smallest mean value in the subsurface volume of interest. In some implementations, the first autocorrelated production value may be the smallest mean value in a given type curve region. The range distribution value may be generated by taking the difference between the first autocorrelated production value and the second autocorrelated production value. For example, referring to FIG. 3, the mean production values may be 300,000 stock tank barrels (STB) for type curve A, 10,000 STB for type curve B, 165,000 STB for type curve C, 100,000 STB for type curve D, 600,000 STB for type curve E, 180,000 STB for type curve F, 210,000 STB for type curve G, 80,000 STB for type curve H, 250,000 STB for type curve I, 213,000 STB for type curve J, and 405,000 STB for type curve K. The first autocorrelated production value may be 0.5 (unitless ratio). The second autocorrelation production value may be 0.45. The range distribution value for subsurface volume of interest 300 may be 590,000 STB. It should be appreciated that this is merely an example, and other volumes within the subsurface volume of interest may be considered to determine the corresponding range distribution values.

Referring back to FIG. 1, type curve cluster probability component 118 may be configured to generate a type curve cluster probability value for each of the type curve regions. This may be accomplished by the physical computer processor. The type curve cluster probability values may be generated based on at least the type curve mean values and the range distribution values. In implementations, the type curve cluster probability values may be generated based on the pooled sample variance, the sample size, the range distribution value, a number of the initial clusters, an analysis of variance of one or more of the production values in the subsurface volume of interest, a true null hypothesis probability, a number of clusters in the initial clusters, and a number of degrees of freedom. In some implementations, the type curve cluster probability values may be generated based on a number of steps. One step may include analyzing the variance on one or more of the production values in the subsurface volume of interest. Another step may include comparing a cluster with every other cluster in the initial clusters with respect to means, means square within, number of samples within a cluster, and degrees of freedom within a cluster. Yet another step may include generating a first type curve similarity value based on the pooled sample variance, the sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and the mean squared error. Yet another step may include comparing the first type curve similarity value with the second type curve similarity value. Comparing the two type curve similarity values may including taking the difference between them. If the resulting type curve cluster probability value is zero or positive, this may represent that the two clusters are different. In some implementations, a p-value may be generated to validate or confirm the results of the above steps.

Figure 3:
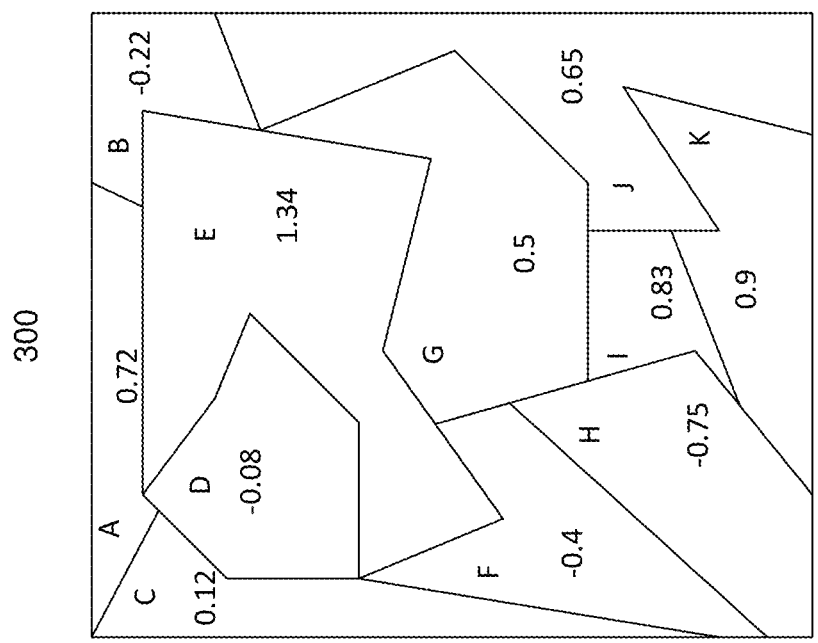
FIG. 3 illustrates a representation of type curve regions and type curve cluster probability values as a function of position, in accordance with one or more implementations.

For example, referring to FIG. 3, various type curve probability values may be illustrated for each type curve region A-K. Type curve region A may have a type curve probability value of 0.72, type curve region B may have a type curve probability value of −0.22, type curve region C may have a type curve probability value of 0.12, type curve region D may have a type curve probability value of −0.08, type curve region E may have a type curve probability value of 1.34, type curve region F may have a type curve probability value of −0.4, type curve region G may have a type curve probability value of 0.5, type curve region H may have a type curve probability value of −0.75, type curve region I may have a type curve probability value of 0.83, type curve region J may have a type curve probability value of 0.65, and type curve region K may have a type curve probability value of 0.9.

Referring back to FIG. 1, representation component 120 may be configured to generate a first representation of the type curve regions as a function of position in the subsurface volume of interest using visual effects to depict type curve probability values corresponding to the type curve regions. In some implementations, a visual effect may include a visual transformation of the representation. A visual transformation may include a visual change in how the representation is presented or displayed. In some implementations, a visual transformation may include a visual zoom, a visual filter, a visual rotation, and/or a visual overlay (e.g., text and/or graphics overlay). The visual effect may include using a temperature map, or other color coding, to indicate which positions in the subsurface volume of interest have higher or lower values.

Referring back to cluster component 108, cluster component 108 may be configured to cluster the type curve regions in updated clusters to reflect the type curve cluster probability value for each of the type curve regions. This may be accomplished by the physical computer processor. The updated clusters may be clustered together in a given updated cluster based on type curve cluster probability values of geographically adjacent type curve regions exceeding a threshold value. Depending on the application, the threshold value may be between 50% and 99.9% chance of rejecting that the two clusters are actually sampling from the same distribution of possible forecast outcome. The updated clusters may be a group of geographically adjacent type curve regions. For example, referring back to FIG. 4, subsurface volume of interest 404 with type curve regions A-K may now be clustered into three updated clusters, instead of the five initial clusters in the example described above. For example, type curve regions A, B, E, and G may represent a first updated cluster (shaded gray in subsurface volume of interest 404), type curve regions C, D, F, H, J, and K may represent a second updated cluster (with horizontal lines in subsurface volume of interest 404), and type curve region I may represent a third updated cluster (unshaded in subsurface volume of interest 404). It should be appreciated that this is an example number of clusters, and the number of clusters can be any number more than two. In this example, each of the type curve regions in a single cluster are touching another one of the type curve regions in the single cluster (e.g., type curve region A touches type curve regions B and E, type curve region B touches type curve regions A and E, type curve region E touches type curve regions A, B, and G, type curve region G touches type curve region E, and these four type curve regions, A, B, E, and G, represent the first updated cluster). The updated clusters may be used to recalibrate whether a fracture operation, a drilling operation, or a combination thereof, is performed in the given updated cluster. For example, adding a type curve region with a large forecasted production to a first initial cluster may make a fracture operation on a first updated cluster viable, while taking this type curve region away from its initial cluster, a second initial cluster, may make a fracture operation on a second updated cluster not viable. It should be appreciated that there may be situations where none of the updated clusters are determined to be a viable operation, where all of the updated clusters are determined to be a viable operation, or somewhere in between.

Referring back to FIG. 1, representation component 120 may be configured to generate a second representation of the type curve regions as a function of position in the subsurface volume of interest using visual effects to depict geographic boundaries outlining at least some of the updated clusters of the type curve regions. This may be accomplished by the physical computer processor.

Representation component 120 may be configured to display the one or more representations, including the first representation and the second representation. The one or more representations may be displayed on a graphical user interface and/or other displays.

In some implementations, server(s) 102, client computing platform(s) 104, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 130 may be operatively linked via some other communication media.

A given client computing platform 104 may include one or more processors configured to execute computer program components. The computer program components may be configured to enable an expert or user associated with the given client computing platform 104 to interface with system 100 and/or external resources 130, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage medium and/or non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, information received from client computing platform(s) 104, and/or other information that enables server(s) 102 to function as described herein.

Processor(s) 134 may be configured to provide information processing capabilities in server(s) 102. As such, processor(s) 134 may include one or more of a physical computer processor, a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 108, 110, 112, 114, 116, 118, 120, and/or other components. Processor(s) 134 may be configured to execute components 108, 110, 112, 114, 116, 118, 120, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, and/or 120 are illustrated in FIG. 1 as being implemented within a single processing unit, in implementations in which processor(s) 134 includes multiple processing units, one or more of components 108, 110, 112, 114, 116, 118, and/or 120 may be implemented remotely from the other components. The description of the functionality provided by the different components 108, 110, 112, 114, 116, 118, and/or 120 described below is for illustrative purposes, and is not intended to be limiting, as any of components 108, 110, 112, 114, 116, 118, and/or 120 may provide more or less functionality than is described. For example, one or more of components 108, 110, 112, 114, 116, 118, and/or 120 may be eliminated, and some or all of its functionality may be provided by other ones of components 108, 110, 112, 114, 116, 118, and/or 120. As an example, processor(s) 134 may be configured to execute one or more additional components that may perform some or all of the functionality attributed below to one of components 108, 110, 112, 114, 116, 118, and/or 120.

Figure 2A:
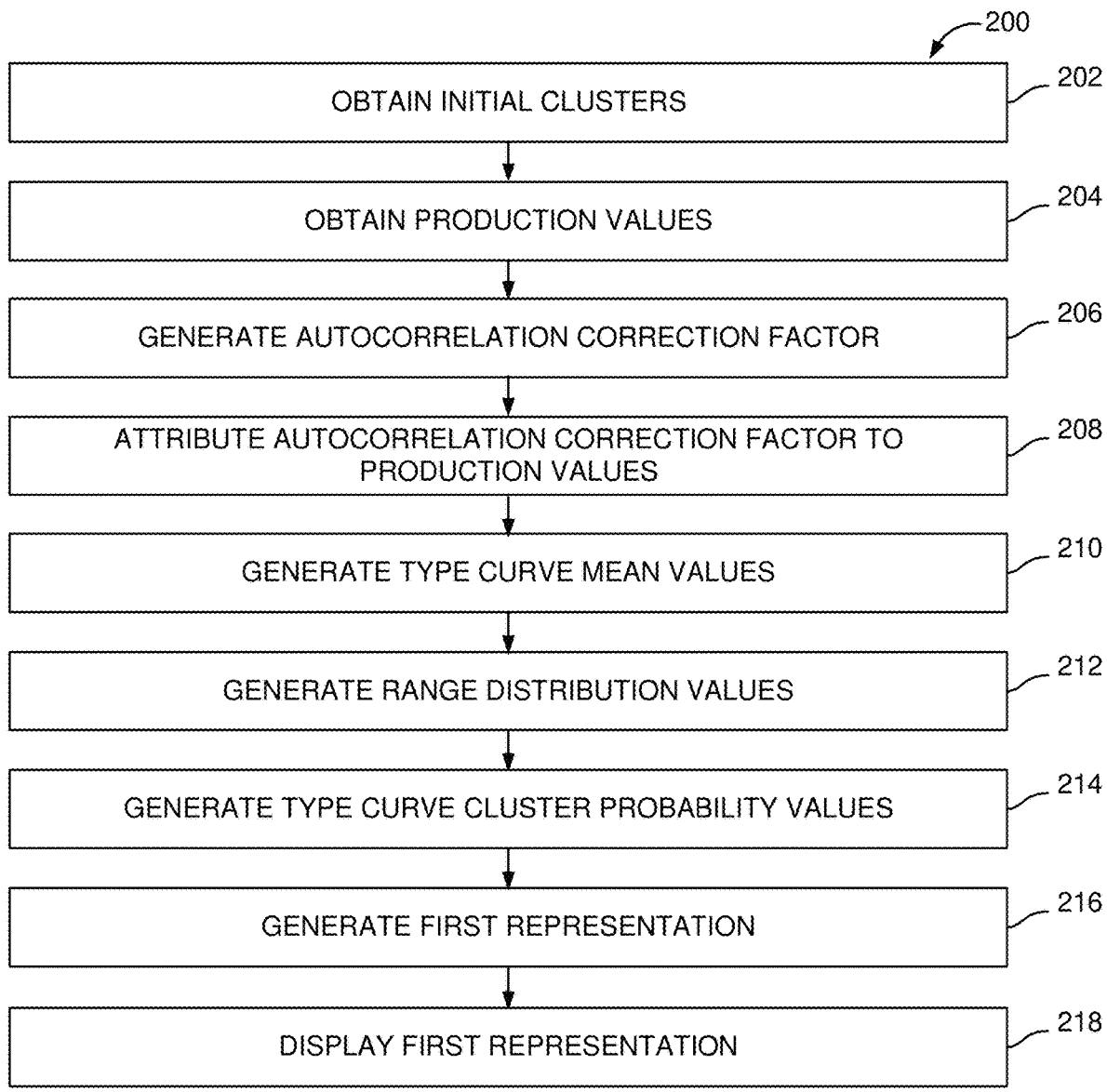
FIG. 2A illustrates a method for analyzing clusters of type curve regions as a function of position in a subsurface volume of interest, in accordance with one or more implementations.

FIG. 2A illustrates a method for analyzing clusters of type curve regions as a function of position in a subsurface volume of interest, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2A and described below is not intended to be limiting.

In some implementations, method 200 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on a non-transitory storage medium. The one or more processing devices may include one or more devices configured through hardware, firmware, and/or software to be specifically designed for execution of one or more of the operations of method 200.

Operation 202 may include obtaining initial clusters. The initial clusters may be geographically adjacent regions in the subsurface volume of interest. Operation 202 may be performed by a physical computer processor configured by machine-readable instructions including a component that is the same as or similar to cluster component 108 in accordance with one or more implementations.

Operation 204 may include obtaining production values. The production values may include position information and may correspond to the type curve regions corresponding to the initial clusters. The production values may include one of cumulative oil, gas, and water production at different time intervals or estimated ultimate recovery (EUR). Operation 204 may be performed by a physical computer processor configured by machine-readable instructions including a component that is the same as or similar to production data component 110 in accordance with one or more implementations.

Operation 206 may include generating an autocorrelation correction factor. The autocorrelation correction factor may be generated by at least comparing changes between individual ones of the production values that are geographically adjacent to other ones of the production values as a function of position. In implementations, the autocorrelation correction factor may be generated by performing a number of steps. One step may include determining the mean and variance of the production values. Another step may include generating a deviation from the mean for every production value. Yet another step may include multiplying and adding the deviations from the mean and normalizing by the variance. Operation 206 may be performed by a physical computer processor configured by machine-readable instructions including a component that is the same as or similar to autocorrelation correction factor component 112 in accordance with one or more implementations.

Operation 208 may include attributing the autocorrelation correction factor to the production values as a function of position to generate autocorrelated production values. Operation 208 may be performed by a physical computer processor configured by machine-readable instructions including a component that is the same as or similar to autocorrelation correction factor component 112, in accordance with one or more implementations.

Operation 210 may include generating type curve mean values. The type curve mean values may be generated by at least comparing mean values of the autocorrelated production values of geographically adjacent type curve areas. Operation 210 may be performed by a physical computer processor configured by machine-readable instructions including a component that is the same as or similar to type curve mean component 114, in accordance with one or more implementations.

Operation 212 may include generating range distribution values. The range distribution values may be generated by at least comparing a first autocorrelated production value with a second autocorrelated production value. Operation 212 may be performed by a physical computer processor configured by machine-readable instructions including a component that is the same as or similar to range distribution component 116, in accordance with one or more implementations.

Operation 214 may include generating type curve cluster probability values. The type curve cluster probability values may be based on at least the type curve mean values and the range distribution values. In some implementations, the type curve cluster probability values may be generated based on a number of steps. One step may include analyzing the variance on one or more of the production values in the subsurface volume of interest. Another step may include comparing a cluster with every other cluster in the initial clusters with respect to means, means square within, number of samples within a cluster, and degrees of freedom within a cluster. Yet another step may include generating a first type curve similarity value based on the pooled sample variance, the sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and the mean squared error. Yet another step may include comparing the first type curve similarity value with the second type curve similarity value. Comparing the two type curve similarity values may including taking the difference between them. Operation 214 may be performed by a physical computer processor configured by machine-readable instructions including a component that is the same as or similar to type curve cluster probability component 118, in accordance with one or more implementations.

Operation 216 may include generating a first representation of the type curve regions as a function of position in the subsurface volume of interest. The first representation may use visual effects to depict type curve cluster probability values corresponding to the type curve regions. Operation 216 may be performed by a physical computer processor configured by machine-readable instructions including a component that is the same as or similar to representation component 120, in accordance with one or more implementations.

Operation 218 may include displaying the first representation. Operation 218 may be performed by a physical computer processor configured by machine-readable instructions including a component that is the same as or similar to representation component 120, in accordance with one or more implementations.

Figure 2B:
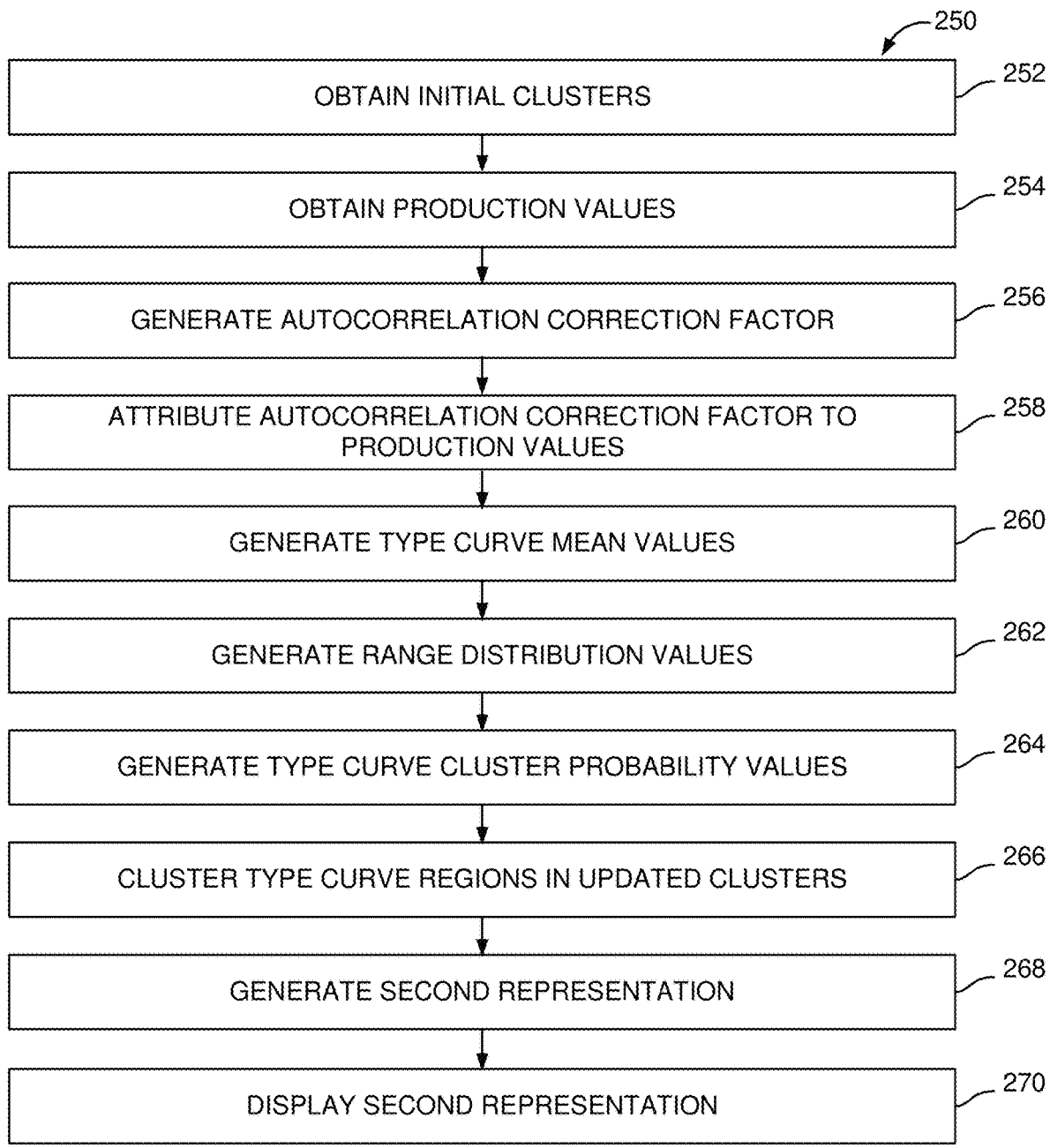
FIG. 2B illustrates a method for analyzing clusters of type curve regions as a function of position in a subsurface volume of interest, in accordance with one or more implementations.

FIG. 2B illustrates a method for analyzing clusters of type curve regions as a function of position in a subsurface volume of interest, in accordance with one or more implementations. The operations of method 250 presented below are intended to be illustrative. In some implementations, method 250 may be accomplished with one or more additional operations not described, and/or without one or more of the operations discussed. Additionally, the order in which the operations of method 250 are illustrated in FIG. 2B and described below is not intended to be limiting.

In some implementations, method 250 may be implemented in one or more processing devices (e.g., a physical computer processor, a digital processor, an analog processor, a digital circuit designed to process information, an analog circuit designed to process information, a state machine, and/or other mechanisms for electronically processing information). The one or more processing devices may include one or more devices executing some or all of the operations of method 250 in response to instructions stored electronically on a non-transitory storage medium. The one or more processing devices may include one or more devices configured through hardware, firmware, and/or software to be specifically designed for execution of one or more of the operations of method 250.

Operation 252 may include obtaining initial clusters. The initial clusters may be geographically adjacent regions in the subsurface volume of interest. Operation 252 may be performed by a physical computer processor configured by machine-readable instructions including a component that is the same as or similar to cluster component 108 in accordance with one or more implementations.

Operation 254 may include obtaining production values. The production values may include position information and may correspond to the type curve regions corresponding to the initial clusters. The production values may include one of cumulative oil, gas, and water production at different time intervals, as well as or estimated ultimate recovery (EUR). Operation 254 may be performed by a physical computer processor configured by machine-readable instructions including a component that is the same as or similar to production data component 110 in accordance with one or more implementations.

Operation 256 may include generating an autocorrelation correction factor. The autocorrelation correction factor may be generated by at least comparing changes between individual ones of the production values that are geographically adjacent to other ones of the production values as a function of position. In implementations, the autocorrelation correction factor may be generated by performing a number of steps. One step may include determining the mean and variance of the production values. Another step may include generating a deviation from the mean for every production value. Yet another step may include multiplying and adding the deviations from the mean and normalizing by the variance. Operation 256 may be performed by a physical computer processor configured by machine-readable instructions including a component that is the same as or similar to autocorrelation correction factor component 112 in accordance with one or more implementations.

Operation 258 may include attributing the autocorrelation correction factor to the production values as a function of position to generate autocorrelated production values. Operation 258 may be performed by a physical computer processor configured by machine-readable instructions including a component that is the same as or similar to autocorrelation correction factor component 112, in accordance with one or more implementations.

Operation 260 may include generating type curve mean values. The type curve mean values may be generated by at least comparing mean values of the autocorrelated production values of geographically adjacent type curve areas. Operation 260 may be performed by a physical computer processor configured by machine-readable instructions including a component that is the same as or similar to type curve mean component 114, in accordance with one or more implementations.

Operation 262 may include generating range distribution values. The range distribution values may be generated by at least comparing a first autocorrelated production value with a second autocorrelated production value. Operation 262 may be performed by a physical computer processor configured by machine-readable instructions including a component that is the same as or similar to range distribution component 116, in accordance with one or more implementations.

Operation 264 may include generating type curve cluster probability values. The type curve cluster probability values may be based on at least the type curve mean values and the range distribution values. In some implementations, the type curve cluster probability values may be generated based on a number of steps. One step may include analyzing the variance on one or more of the production values in the subsurface volume of interest. Another step may include comparing a cluster with every other cluster in the initial clusters with respect to means, means square within, number of samples within a cluster, and degrees of freedom within a cluster. Yet another step may include generating a first type curve similarity value based on the pooled sample variance, the sample size, the range distribution value, a number of the initial clusters, an analysis of variance of one or more of the production values in the subsurface volume of interest, a true null hypothesis probability, a number of clusters in the initial clusters, and a number of degrees of freedom. Another step may include generating a second type curve similarity value based on the first type curve similarity value, the pooled sample variance, and the mean squared error. Yet another step may include comparing the first type curve similarity value with the second type curve similarity value. Comparing the two type curve similarity values may including taking the difference between them. Operation 264 may be performed by a physical computer processor configured by machine-readable instructions including a component that is the same as or similar to type curve cluster probability component 118, in accordance with one or more implementations.

Operation 266 may include clustering the type curve regions in updated clusters to reflect the type curve cluster probability value for each of the type curve regions. The updated clusters may be clustered together in a given updated cluster based on type curve cluster probability values of geographically adjacent type curve areas exceeding a threshold value. The threshold value may be between 50% and 99.9%. Operation 266 may be performed by a physical computer processor configured by machine-readable instructions including a component that is the same as or similar to cluster component 108, in accordance with one or more implementations.

Operation 268 may include generating a second representation of the type curve regions as a function of position in the subsurface volume of interest. The second representation may use visual effects to depict geographic boundaries outlining at least some of the updated clusters of the type curve regions. Operation 268 may be performed by a physical computer processor configured by machine-readable instructions including a component that is the same as or similar to representation component 120, in accordance with one or more implementations.

Operation 270 may include displaying the second representation. Operation 270 may be performed by a physical computer processor configured by machine-readable instructions including a component that is the same as or similar to representation component 120, in accordance with one or more implementations.

FIG. 3 illustrates a representation of type curve regions and type curve cluster probability values as a function of position, in accordance with one or more implementations. The eleven type curve regions A-K in the subsurface volume of interest 300 may be determined based on existing methods. The presently disclosed technology provides type curve cluster probability values that can be visually attributed to the corresponding type curve region as illustrated in FIG. 3. Type curve region A may have a type curve probability value of 0.72, type curve region B may have a type curve probability value of −0.22, type curve region C may have a type curve probability value of 0.12, type curve region D may have a type curve probability value of −0.08, type curve region E may have a type curve probability value of 1.34, type curve region F may have a type curve probability value of −0.4, type curve region G may have a type curve probability value of 0.5, type curve region H may have a type curve probability value of −0.75, type curve region I may have a type curve probability value of 0.83, type curve region J may have a type curve probability value of 0.65, and type curve region K may have a type curve probability value of 0.9. It should be appreciated that these are random numbers used to depict a potential range of values that may be appropriate for a given situation, and they are not limiting.

Figure 4:
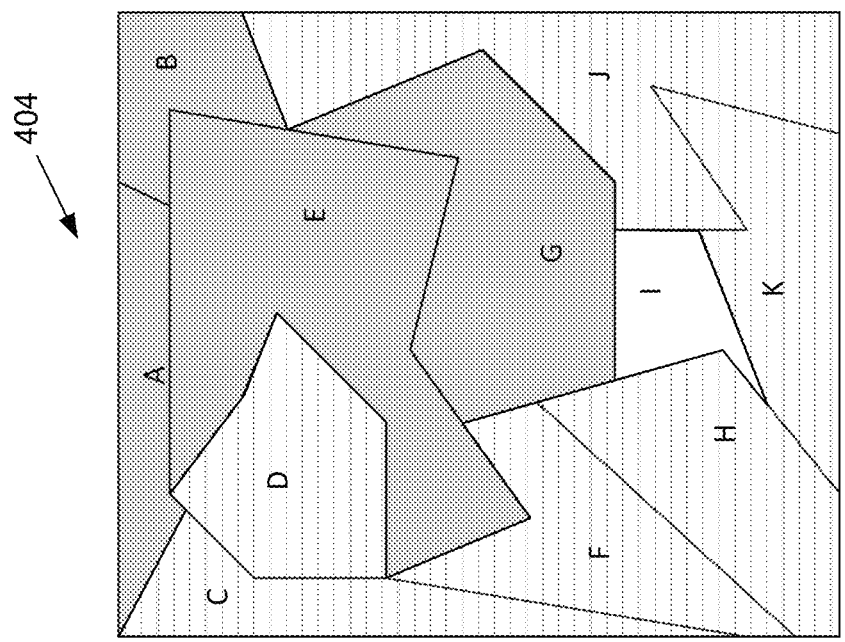
FIG. 4 illustrates representations of type curve regions, initial clusters, and updated clusters, in accordance with one or more implementations.
Figure 4:
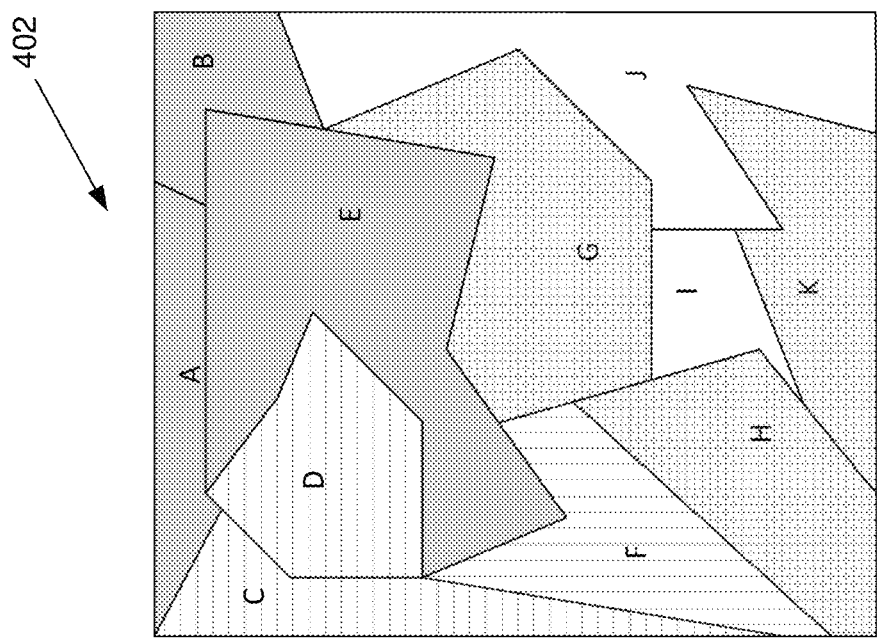

FIG. 4 illustrates representations of type curve regions, initial clusters, and updated clusters, in accordance with one or more implementations. Subsurface volume of interest 402 represents initial clusters of type curve regions A-K. Subsurface volume of interest 404 may represent the same subsurface volume of interest as subsurface volume of interest 402 with updated clusters of type curve regions A-K. As illustrated, type curve regions A-K may be clustered into five different initial clusters in subsurface volume of interest 402. For example, type curve regions A, B, and E may represent a first initial cluster (shaded gray in subsurface volume of interest 402), type curve regions C and D may represent a second initial cluster (with horizontal lines in subsurface volume of interest 402), type curve region F may represent a third initial cluster (with vertical lines in subsurface volume of interest 402), type curve regions G, H, and K may represent a fourth initial cluster (with horizontal and vertical lines in subsurface volume of interest 402), and type curve regions I and J may represent a fifth initial cluster (unshaded in subsurface volume of interest 402).

After using the presently disclosed technology, subsurface volume of interest 404 with type curve regions A-K may now be clustered into three updated clusters, instead of the five initial clusters in the example described above. For example, type curve regions A, B, E, and G may represent a first updated cluster (shaded gray in subsurface volume of interest 404), type curve regions C, D, F, H, J, and K may represent a second updated cluster (with horizontal lines in subsurface volume of interest 404), and type curve region I may represent a third updated cluster (unshaded in subsurface volume of interest 404). It should be appreciated that this is an example number of clusters, and the number of clusters can be any number more than two. It should be appreciated that these are random clusters used to depict a potential range of clusters that may be appropriate for a given situation, and they are not limiting.

Figure 5:
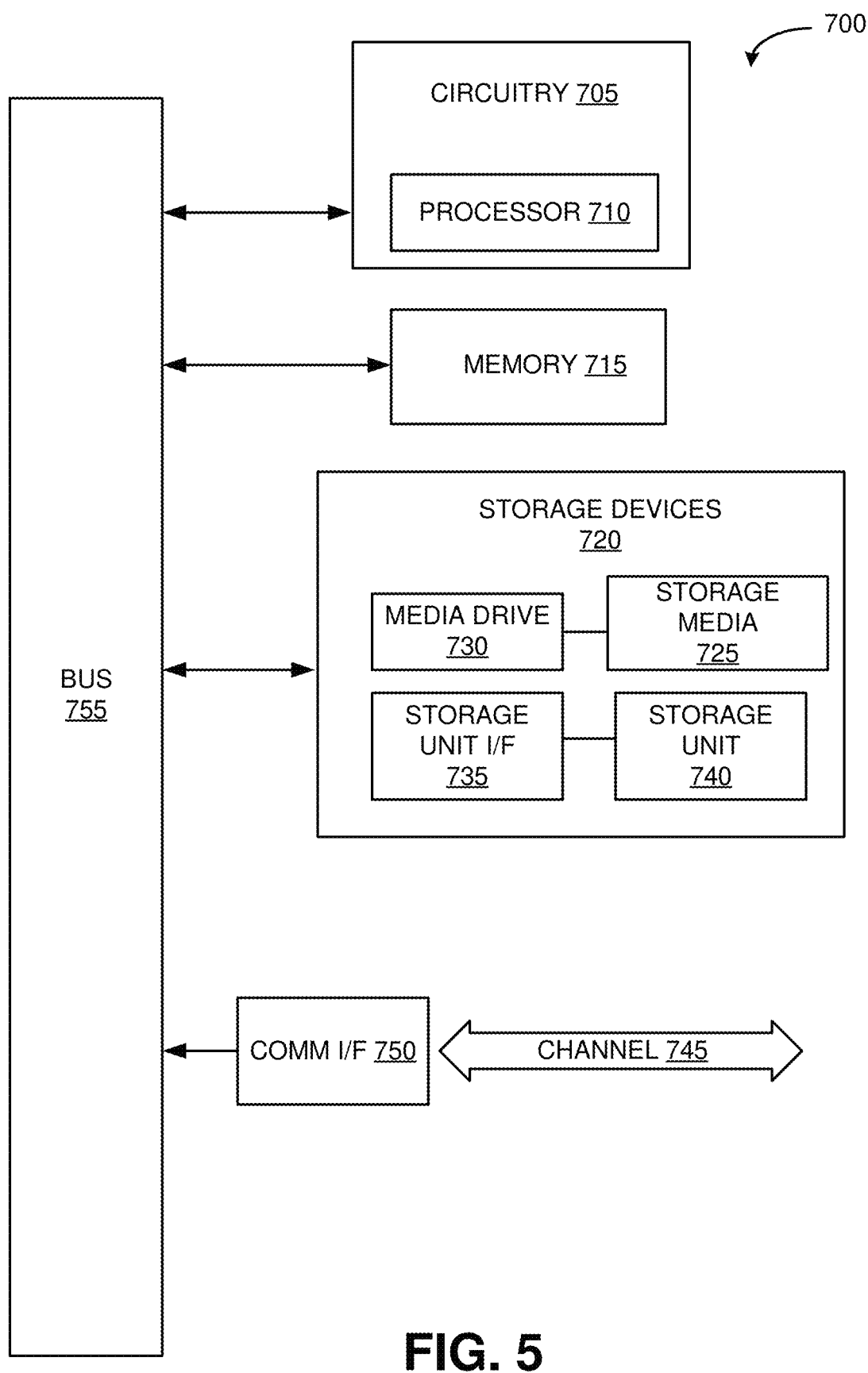
FIG. 5 illustrates example computing component, in accordance with some implementations.

FIG. 5 illustrates example computing component 500, which may in some instances include a processor/controller resident on a computer system (e.g., server system 106). Computing component 500 may be used to implement various features and/or functionality of implementations of the systems, devices, and methods disclosed herein. With regard to the above-described implementations set forth herein in the context of systems, devices, and methods described with reference to FIGS. 1 through 4, including implementations involving server(s) 102, it may be appreciated additional variations and details regarding the functionality of these implementations that may be carried out by computing component 500. In this connection, it will also be appreciated upon studying the present disclosure that features and aspects of the various implementations (e.g., systems) described herein may be implemented with respect to other implementations (e.g., methods) described herein without departing from the spirit of the disclosure.

As used herein, the term component may describe a given unit of functionality that may be performed in accordance with some implementations of the present application. As used herein, a component may be implemented utilizing any form of hardware, software, or a combination thereof. For example, a processor, controller, ASIC, PLA, PAL, CPLD, FPGA, logical component, software routine, or other mechanism may be implemented to make up a component. In implementation, the various components described herein may be implemented as discrete components or the functions and features described may be shared in part or in total among components. In other words, it should be appreciated that after reading this description, the various features and functionality described herein may be implemented in any given application and may be implemented in separate or shared components in various combinations and permutations. Even though various features or elements of functionality may be individually described or claimed as separate components, it will be appreciated that upon studying the present disclosure that these features and functionality may be shared among a common software and hardware element, and such description shall not require or imply that separate hardware or software components are used to implement such features or functionality.

Where components of the application are implemented in whole or in part using software, in implementations, these software elements may be implemented to operate with a computing or processing component capable of carrying out the functionality described with respect thereto. One such example computing component is shown in FIG. 5. Various implementations are described in terms of example computing component 500. After reading this description, it will be appreciated how to implement example configurations described herein using other computing components or architectures.

Referring now to FIG. 5, computing component 500 may represent, for example, computing or processing capabilities found within mainframes, supercomputers, workstations or servers; desktop, laptop, notebook, or tablet computers; hand-held computing devices (tablets, PDA's, smartphones, cell phones, palmtops, etc.); or the like, depending on the application and/or environment for which computing component 500 is specifically purposed.

Computing component 500 may include, for example, a processor, physical computer processor, controller, control component, or other processing device, such as a processor 510, and such as may be included in circuitry 505. Processor 510 may be implemented using a special-purpose processing engine such as, for example, a microprocessor, controller, or other control logic. In the illustrated example, processor 510 is connected to bus 555 by way of circuitry 505, although any communication medium may be used to facilitate interaction with other components of computing component 500 or to communicate externally.

Computing component 500 may also include a memory component, simply referred to herein as main memory 515. For example, random access memory (RAM) or other dynamic memory may be used for storing information and instructions to be executed by processor 510 or circuitry 505. Main memory 515 may also be used for storing temporary variables or other intermediate information during execution of instructions to be executed by processor 510 or circuitry 505. Computing component 500 may likewise include a read only memory (ROM) or other static storage device coupled to bus 555 for storing static information and instructions for processor 510 or circuitry 505.

Computing component 500 may also include various forms of information storage devices 520, which may include, for example, media drive 530 and storage unit interface 535. Media drive 530 may include a drive or other mechanism to support fixed or removable storage media 525. For example, a hard disk drive, a floppy disk drive, a magnetic tape drive, an optical disk drive, a CD or DVD drive (R or RW), or other removable or fixed media drive may be provided. Accordingly, removable storage media 525 may include, for example, a hard disk, a floppy disk, magnetic tape, cartridge, optical disk, a CD or DVD, or other fixed or removable medium that is read by, written to, or accessed by media drive 530. As these examples illustrate, removable storage media 525 may include a computer usable storage medium having stored therein computer software or data.

In alternative implementations, information storage devices 520 may include other similar instrumentalities for allowing computer programs or other instructions or data to be loaded into computing component 500. Such instrumentalities may include, for example, fixed or removable storage unit 540 and storage unit interface 535. Examples of such removable storage units 540 and storage unit interfaces 535 may include a program cartridge and cartridge interface, a removable memory (for example, a flash memory or other removable memory component) and memory slot, a PCMCIA slot and card, and other fixed or removable storage units 540 and storage unit interfaces 535 that allow software and data to be transferred from removable storage unit 540 to computing component 500.

Computing component 500 may also include a communications interface 550. Communications interface 550 may be used to allow software and data to be transferred between computing component 500 and external devices. Examples of communications interface 550 include a modem or soft-modem, a network interface (such as an Ethernet, network interface card, WiMedia, IEEE 502.XX, or other interface), a communications port (such as for example, a USB port, IR port, RS232 port Bluetooth® interface, or other port), or other communications interface. Software and data transferred via communications interface 550 may typically be carried on signals, which may be electronic, electromagnetic (which includes optical) or other signals capable of being exchanged by a given communications interface 550. These signals may be provided to/from communications interface 550 via channel 545. Channel 545 may carry signals and may be implemented using a wired or wireless communication medium. Some non-limiting examples of channel 545 include a phone line, a cellular or other radio link, an RF link, an optical link, a network interface, a local or wide area network, and other wired or wireless communications channels.

In this document, the terms "computer program medium" and "computer usable medium" are used to generally refer to transitory or non-transitory media such as, for example, main memory 515, storage unit interface 535, removable storage media 525, and channel 545. These and other various forms of computer program media or computer usable media may be involved in carrying a sequence of instructions to a processing device for execution. Such instructions embodied on the medium, are generally referred to as "computer program code" or a "computer program product" (which may be grouped in the form of computer programs or other groupings). When executed, such instructions may enable the computing component 500 or a processor to perform features or functions of the present application as discussed herein.

Various implementations have been described with reference to specific example features thereof. It will, however, be evident that various modifications and changes may be made thereto without departing from the broader spirit and scope of the various implementations as set forth in the appended claims. The specification and figures are, accordingly, to be regarded in an illustrative rather than a restrictive sense.

Although described above in terms of various example implementations and implementations, it should be understood that the various features, aspects, and functionality described in one of the individual implementations are not limited in their applicability to the particular implementation with which they are described, but instead may be applied, alone or in various combinations, to other implementations of the present application, whether or not such implementations are described and whether or not such features are presented as being a part of a described implementation. Thus, the breadth and scope of the present application should not be limited by any of the above-described example implementations.

Terms and phrases used in the present application, and variations thereof, unless otherwise expressly stated, should be construed as open ended as opposed to limiting. As examples of the foregoing: the term "including" should be read as meaning "including, without limitation," or the like; the term "example" is used to provide illustrative instances of the item in discussion, not an exhaustive or limiting list thereof; the terms "a" or "an" should be read as meaning "at least one," or the like; and adjectives such as "standard," "known," and terms of similar meaning should not be construed as limiting the item described to a given time period or to an item available as of a given time, but instead should be read to encompass standard technologies that may be available or known now or at any time in the future. Likewise, where this document refers to technologies that would be appreciated to one of ordinary skill in the art, such technologies encompass that which would be appreciated by the skilled artisan now or at any time in the future.

The presence of broadening words and phrases such as "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, may be combined in a single package or separately maintained and may further be distributed in multiple groupings or packages or across multiple locations.

Additionally, the various implementations set forth herein are described in terms of example block diagrams, flow charts, and other illustrations. As will be appreciated after reading this document, the illustrated implementations and their various alternatives may be implemented without confinement to the illustrated examples. For example, block diagrams and their accompanying description should not be construed as mandating a particular architecture or configuration.

What is claimed is:

1. A computer-implemented method for analyzing type curve regions in a subsurface volume of interest, the computer-implemented method being implemented in a computer system that comprises a display, a physical computer processor, and a non-transitory storage medium, the computer-implemented method comprising:

obtaining, from the non-transitory storage medium, initial clusters of type curve regions in the subsurface volume of interest, wherein the initial clusters are geographically adjacent regions in the subsurface volume of interest;

obtaining, from the non-transitory storage medium, production values as a function of position corresponding to the type curve regions corresponding to the initial clusters;

generating, with the physical computer processor, an autocorrelation correction factor by:
determining a mean and a variance of the production values
generating a deviation from the mean for every production value,
multiplying and adding the deviations from the mean to generate summed cross products,
normalizing the summed cross products by the variance, and
comparing changes between individual ones of the production values that are geographically adjacent to other ones of the production values as a function of position;

attributing, with the physical computer processor, the autocorrelation correction factor to the production values as a function of position to generate autocorrelated production values, wherein metadata of the autocorrelated production values includes the autocorrelation correction factor;

generating, with the physical computer processor, type curve mean values by comparing mean values of the autocorrelated production values of geographically adjacent type curve regions;

generating, with the physical computer processor, range distribution values by comparing a first autocorrelated production value with a second autocorrelated production value;

generating, with the physical computer processor, a type curve cluster probability value for each of the type curve regions based on the type curve mean values and the range distribution values;

generating, with the physical computer processor, a first representation of the type curve regions as a function of position in the subsurface volume of interest using visual effects to depict type curve cluster probability values corresponding to the type curve regions; and displaying the first representation via the display.

2. The computer-implemented method of claim 1, wherein the computer-implemented method further comprises:

clustering, with the physical computer processor, the type curve regions in updated clusters to reflect the type curve cluster probability value for each of the type curve regions, wherein the updated clusters are clustered together in a given updated cluster based on type curve cluster probability values of geographically adjacent type curve regions exceeding a threshold value.

3. The computer-implemented method of claim 2, wherein the threshold value is between 50% and 99.9%.

4. The computer-implemented method of claim 2, wherein the updated clusters are used to inform a fracture operation, a drilling operation, or a combination thereof in the given updated cluster.

5. The computer-implemented method of claim 2, wherein the computer-implemented method further comprises:

generating, with the physical computer processor, a second representation of the type curve regions as a function of position in the subsurface volume of interest using visual effects to depict geographic boundaries outlining some of the updated clusters of the type curve regions; and displaying the second representation via the display.

6. The computer-implemented method of claim 1, wherein the type curve cluster probability value for each of the type curve regions is generated by:

analyzing the variance on one or more of the production values in the subsurface volume of interest;

comparing a cluster with other clusters in the initial clusters with respect to means, means square within, number of samples within a given cluster, and degrees of freedom within the given cluster;

generating a first type curve similarity value based on a pooled sample variance, a sample size, the range distribution value, a number of the initial clusters, the analysis of the variance of one or more of the production values in the subsurface volume of interest, a true null hypothesis probability, a number of clusters in the initial clusters, and a number of degrees of freedom;

generating a second type curve similarity value based on the first type curve similarity value, the pooled sample variance, and a mean squared error; and comparing the first type curve similarity value with the second type curve similarity value.

7. A system comprising:

a display;

a non-transitory storage medium; and a physical computer processor configured by machine-readable instructions to:

obtain, from the non-transitory storage medium, initial clusters of type curve regions in a subsurface volume of interest, wherein the initial clusters are geographically adjacent regions in the subsurface volume of interest;

obtain, from the non-transitory storage medium, production values as a function of position corresponding to the type curve regions corresponding to the initial clusters;

generate, with the physical computer processor, an autocorrelation correction factor by:

determining a mean and a variance of the production values, generating a deviation from the mean for every production value, multiplying and adding the deviations from the mean to generate summed cross products normalizing the summed cross products by the variance, and comparing changes between individual ones of the production values that are geographically adjacent to other ones of the production values as a function of position;

attribute, with the physical computer processor, the autocorrelation correction factor to the production values as a function of position to generate autocorrelated production values, wherein metadata of the autocorrelated production values includes the autocorrelation correction factor;

generate, with the physical computer processor, type curve mean values comparing mean values of the autocorrelated production values of geographically adjacent type curve regions;

generate, with the physical computer processor, range distribution values by comparing a first autocorrelated production value with a second autocorrelated production value;

generate, with the physical computer processor, a type curve cluster probability value for each of the type curve regions based on the type curve mean values and the range distribution values;

generate, with the physical computer processor, a first representation of the type curve regions as a function of position in the subsurface volume of interest using visual effects to depict type curve cluster probability values corresponding to the type curve regions; and display the first representation via the display.

8. The system of claim 7, wherein the physical computer processor is further configured by machine readable instructions to:

cluster, with the physical computer processor, the type curve regions in updated clusters to reflect the type curve cluster probability value for each of the type curve regions, wherein the updated clusters are clustered together in a given updated cluster based on type curve cluster probability values of geographically adjacent type curve regions exceeding a threshold value.

9. The system of claim 8, wherein the threshold value is between 50% and 99.9%.

10. The system of claim 8, wherein the updated clusters are used to inform a fracture operation, a drilling operation, or a combination thereof in the given updated cluster.

11. The system of claim 8, wherein the physical computer processor is further configured by machine readable instructions to:

generate, with the physical computer processor, a second representation of the type curve regions as a function of position in the subsurface volume of interest using visual effects to depict geographic boundaries outlining some of the updated clusters of the type curve regions; and display the second representation via the display.

12. The system of claim 7, wherein the type curve cluster probability value for each of the type curve regions is generated by:

analyzing the variance on one or more of the production values in the subsurface volume of interest;

comparing a cluster with other clusters in the initial clusters with respect to means, means square within, number of samples within a given cluster, and degrees of freedom within the given cluster;

generating a first type curve similarity value based on a pooled sample variance, a sample size, the range distribution value, a number of the initial clusters, the analysis of the variance of one or more of the production values in the subsurface volume of interest, a true null hypothesis probability, a number of clusters in the initial clusters, and a number of degrees of freedom;

generating a second type curve similarity value based on the first type curve similarity value, the pooled sample variance, and a mean squared error; and comparing the first type curve similarity value with the second type curve similarity value.

13. A computer-implemented method for analyzing type curve regions in a subsurface volume of interest, the computer-implemented method being implemented in a computer system that comprises a display, a physical computer processor, and a non-transitory storage medium, the computer-implemented method comprising:

obtaining, from the non-transitory storage medium, initial clusters of type curve regions in the subsurface volume of interest, wherein the initial clusters are geographically adjacent regions in the subsurface volume of interest;

obtaining, from the non-transitory storage medium, production values as a function of position corresponding to the type curve regions corresponding to the initial clusters;

generating, with the physical computer processor, an autocorrelation correction factor by comparing changes between individual ones of the production values that are geographically adjacent to other ones of the production values as a function of position;

attributing, with the physical computer processor, the autocorrelation correction factor to the production values as a function of position to generate autocorrelated production values, wherein metadata of the autocorrelated production values includes the autocorrelation correction factor;

generating, with the physical computer processor, type curve mean values by comparing mean values of the autocorrelated production values of geographically adjacent type curve regions;

generating, with the physical computer processor, range distribution values by comparing a first autocorrelated production value with a second autocorrelated production value;

generating, with the physical computer processor, a type curve cluster probability value for each of the type curve regions based on the type curve mean values and the range distribution values by:

analyzing a variance on one or more of the production values in the subsurface volume of interest, comparing a cluster with other clusters in the initial clusters with respect to means, means square within, number of samples within a given cluster, and degrees of freedom within the given cluster, generating a first type curve similarity value based on a pooled sample variance, a sample size, the range distribution values, a number of the initial clusters, the analysis of the variance of one or more of the production values in the subsurface volume of interest, a true null hypothesis probability, a number of clusters in the initial clusters, and a number of degrees of freedom, generating a second type curve similarity value based on the first type curve similarity value, the pooled sample variance, and a mean squared error, and comparing the first type curve similarity value with the second type curve similarity value;

generating, with the physical computer processor, a first representation of the type curve regions as a function of position in the subsurface volume of interest using visual effects to depict type curve cluster probability values corresponding to the type curve regions; and displaying the first representation via the display.

14. The computer-implemented method of claim 13, wherein the computer-implemented method further comprises:

clustering, with the physical computer processor, the type curve regions in updated clusters to reflect the type curve cluster probability value for each of the type curve regions, wherein the updated clusters are clustered together in a given updated cluster based on type curve cluster probability values of geographically adjacent type curve regions exceeding a threshold value;

generating, with the physical computer processor, a second representation of the type curve regions as a function of position in the subsurface volume of interest using visual effects to depict geographic boundaries outlining some of the updated clusters of the type curve regions; and displaying the second representation via the display.

15. The computer-implemented method of claim 14, wherein the threshold value is between 50% and 99.9%.

16. The computer-implemented method of claim 1, wherein the visual effects comprise color coding to indicate which positions in the subsurface volume of interest have higher or lower type curve cluster probability values.

17. The system of claim 7, wherein the visual effects comprise color coding to indicate which positions in the subsurface volume of interest have higher or lower type curve cluster probability values.

18. The computer-implemented method of claim 1, wherein the autocorrelation correction factor weights a number of samples of production values as a function of position in the subsurface volume of interest.

19. The system of claim 7, wherein the autocorrelation correction factor weights a number of samples of production values as a function of position in the subsurface volume of interest.

20. The computer-implemented method of claim 13, wherein the autocorrelation correction factor weights a number of samples of production values as a function of position in the subsurface volume of interest.

* * * * *